United States Patent [19]

Brennan et al.

[11] 4,125,457

[45] Nov. 14, 1978

[54] PROCESS OF TREATING LUBRICATING OILS WITH ACIDIFIED SORBENT

[75] Inventors: James A. Brennan, Cherry Hill; Stanley J. Lucki, Runnemede, both of N.J.

[73] Assignee: Mobil Oil Corporation, New York, N.Y.

[21] Appl. No.: 830,251

[22] Filed: Sep. 2, 1977

[51] Int. Cl.² ............................................. C10G 25/00
[52] U.S. Cl. ................................ 208/254 R; 208/297; 208/299
[58] Field of Search ................... 208/254 R, 299, 260, 208/248, 297, 254 H, 245, 241

[56] References Cited

U.S. PATENT DOCUMENTS

| | | | |
|---|---|---|---|
| 962,841 | 6/1910 | Hood et al. | 208/297 |
| 1,991,049 | 2/1935 | Campbell | 208/254 R |

FOREIGN PATENT DOCUMENTS 616,735  1/1949  United Kingdom ..................... 208/248

*Primary Examiner*—George Crasanakis
*Attorney, Agent, or Firm*—Charles A. Huggett; Raymond W. Barclay; Howard M. Flournoy

[57] ABSTRACT

Hydrocarbon lubricating oils are upgraded by removing polar compounds contained therein and improving the oxidation stability thereof using an acidified sorbent, such as alumina, silica-alumina or bauxite treated with anhydrous HCl, anhydrous HBr, aqueous $(NH_4)_2SO_4$ or $H_2SO_4$. The acidified sorbent contains at least 3%, by weight of the acidified sorbent, of $Cl^-$, $Br^-$ or $SO_4^=$ ions. The process of upgrading the lube oils is carried out at a temperature ranging from ambient to about 250° F and LHSV of 0.1 – 10.

8 Claims, No Drawings

PROCESS OF TREATING LUBRICATING OILS WITH ACIDIFIED SORBENT

BACKGROUND OF THE INVENTION

1. Field of the Invention

This invention relates to the upgrading of hydrocarbon oils, e.g., solvent refined automotive oils to oils of turbine quality by treating with an acidified sorbent. Treatment results in the effective removal of polar compounds, e.g., nitrogenous compounds, normally present in such oils and in improved oxidation stability of the oil.

2. Description of the Prior Art

It is known that undesirable nitrogen compounds may be removed from hydrocarbon oils by passing the oil through alumina, bauxite and the like; U.S. 2,384,315. Also, that denitrification of hydrocarbon oils can be accomplished by treatment with a silica/alumina catalyst promoted with fluorine; U.S. Pat. No. 3,014,860. Further, heavy residual hydrocarbon stocks can be upgraded by dispersion in a solvent mixture of methyl ethers and thereafter catalytically cracked by, for example, a zeolitic cracking catalyst; U.S. Pat. No. 3,966,586.

However, mere removal of nitrogen compounds from hydrocarbon oils is not sufficient to upgrade automotive quality oil to turbine quality nor is catalytic cracking a viable means for upgrading refined hydrocarbon base stock to turbine quality oil.

SUMMARY OF THE INVENTION

In this invention hydrocarbon oils, particularly refined hydrocarbon oils of automotive oil quality are upgraded to, for example, turbine quality oil by contacting the oil under appropriate conditions of temperature, pressure and space velocity with an acidified sorbent such as alumina thereby removing polar compounds contained therein and improving the oxidation stability of the oil and upgrading the quality thereof.

The sorbents that are preferred for use in this invention are various inorganic oxides including the group consisting of alumina, silica/alumina and bauxite.

The above-noted sorbents may be acidified in any convenient manner known to art. For example, the following acidifying procedure is used when the acidifying agent is aqueous; e.g., aqueous $(NH_4)_2SO_4$ is contacted at ambient temperature and pressure with a fresh calcined batch of alumina for a period of 0.5 to 24 hours. After excess acidifying solution is removed, the impregnated alumina is dried then heated for about 2 to 24 hours at a temperature of 850 to 1050° F.

The acid itself or a salt thereof may be used for this purpose. Suitable acidifying agents include both aqueous and anhydrous mineral acids, for example, HCl, HBr, $H_2SO_4$ and $(NH_4)_2SO_4$. Preferred for use as acidifying agents are $(NH_4)_2SO_4$ and HCl. The sorbents may be acidified with an aqueous solution or by adsorption of anhydrous acid gas. For example, acidification with $(NH_4)_2SO_4$ is via an aqueous medium while acidification with HCl is via anhydrous hydrogen chloride.

Generally speaking, the sorbents should contain at least 3 weight percent of the acidifying material and preferably from about 6 to about 22 weight percent based on the total weight of the sorbent composition.

DESCRIPTION OF THE PREFERRED EMBODIMENTS

Examples 1–5 identified in Table 1 below are sorbents outside the scope of this invention.

Table 1 is directed to data comparing said sorbents outside the scope of the invention with sorbents in accordance therewith; Table 2 is directed to data relative to acidified and unacidified gamma-alumina; and Table 3 shows the general properties of the base oil stock used in the tests. Table 4 is a comparison of selected sorbents in the Rotary Bomb Oxidation Test.

EXAMPLE 6

A sulfated alumina sorbent containing 7 percent sulfur was prepared with $(NH_4)_2SO_4$ as follows:

One hundred ml (57 g.) of 30/60 mesh gamma alumina, freshly air calcined for 16 hours at 950° F and cooled to room temperature, was rapidly added to 150 ml of a 43 wt % aqueous solution of $(NH_4)_2SO_4$ in a medium porosity, glass fritted funnel at room temperature. The mixture was allowed to stand for 30 minutes, vacuum was applied and the excess solution of ammonium salt was withdrawn. The $(NH_4)_2SO_4$ impregnated alumina was then placed in an oven and air dried for 3 hours at 230° F. The dried impregnated alumina was heated at 18° F/min to 950° F in a stream of helium at a gas volume ratio of 19/1. It was then held at 950° F for 2 hours. The calcined, sulfated alumina, sorbant contained 7 wt % S.

EXAMPLE 7

Another sample of a sulfated alumina sorbent was prepared in accordance with Example 6.

EXAMPLE 8

A 57 gm. sample of alumina was obtained commercially, and acidified as follows with anhydrous HCl;

One hundred ml (57 g.) of 30/60 mesh gamma alumina freshly air calcined for 16 hours at 950° F and cooled to room temperature, was placed in a horizontal glass tube and heated at 18° F/minute in a stream of helium to 950° F. The helium rate was constant at 110 cc/minute. At 950° F anhydrous HCl was introduced at a rate of 40 cc/minute. The duration of chloriding at 950° F was for three hours at a total (helium and hydrogen chloride) gas rate of 150 cc/minute.

After three hours at 950° F the hydrogen chloride treatment was stopped and the alumina cooled to room temperature in a stream of helium. The resultant chlorided alumina contained 3.5 wt % Cl.

EXAMPLE 9

Another sample of a chloride alumina sorbent was prepared in accordance with Example 8.

The above prepared samples of acidified sorbent material were then subjected to the following standard test methods for determining the oxidation characteristics of steam-turbine oils: ASTM D943-54, reapproved 1973 and commonly called TOST (Turbine Oil Stability Test), a long term test method and ASTM D2272-67, reapproved 1972, commonly known as RBOT (Rotary Bomb Oxidation Test), a relatively short term method. It is noted that a successful TOST does not necessarily follow a successful RBOT. In other words, the short term RBOT does not necessarily correlate with the long term TOST. However, successful completion of both tests is a requisite for turbine quality oils. Consequently, lighter color, low total N and improved RBOT test values cannot be used as criterion to predict TOST performance. A successful RBOT is about 300 minutes or more and a successful TOST is at least 4000 hours. Table 1 is a tabulation of the RBOT and TOST test data with regard to the aforementioned Examples 2-9, and an aliquot of oil not contacted with one of the herein disclosed acidified sorbents.

Arab Light stock was the test hydrocarbon base oil; its characteristics are as shown in Table 3.

The tests unless otherwise specified were performed in approximately one-inch I.D. glass columns, jacketed for heating and packed with the appropriate solid (~30/60 mesh).

The oil to be tested was pumped from bottom to top (upflow). Alternatively the oil to be treated may be pumped from top to bottom (downflow). Temperature was varied between ambient and 250° F. The charge stock, as noted supra, used throughout the tests was an Arab Light (normal solvent treat) automotive quality 150 second lubricating oil.

Cumulative blends of treated oils were made at various oil/solid levels and results monitored using ppm N, color and the RBOT and TOST tests to determine improvement in oxidation stability. Since the charge stock already meets the technical standards for color, color was used to a lesser degree. Nine samples of treated oils were selected for evaluation. All RBOT and TOST analyses were made on samples after additive blending.

TABLE 3

| Arab Light Stock | |
|---|---|
| Properties | |
| KV at 100° F, cs. | 33.6 |
| at 210° F, cs. | 5.41 |
| SUS at 100° F | 157.7 |
| at 210° F | 44.0 |
| Viscosity Index | 105 |
| VI (adjusted to 20° pour) | 108 |
| Pour Point, ° F | 5 |
| Flash Point, ° F | 420 |
| Tan | 0.05 |
| Sulfur, Wt. % | 0.71 |
| Nitrogen, ppm | 22 |
| CCR | 0.01 |
| Aniline Point, ° F | 207.0 |
| Color, ASTM | L 1.5 |
| Demulsibility at 130° F | |
| Time to 3 ml, min. | 12 |
| Time to break, min. | 25 |
| ASTM Distillation, IBP, ° F | 665 |
| 5% | 755 |
| 10% | 780 |
| 20% | 792 |
| 30% | 801 |
| 40% | 809 |
| 50% | 815 |
| 60% | 823 |
| 70% | 832 |
| 80% | 841 |
| 90% | 855 |
| 95% | 861 |

Table 2 is a collection of RBOT data under identical test conditions wherein untreated alumina, chlorided alumina and sulfated alumina were used as sorbents. Arab Light stock was passed through beds of calcined gamma-alumina, chlorided gamma-alumina and sulfated

TABLE 1

Upgrading Arab Light Normal Stock With Acidic Sorbents

| Ex. | Sorbent | Temp. °F | LHSV | Oil Sorbent Vol | Saybolt Color | N ppm | RBOT mins | TOST Hours |
|---|---|---|---|---|---|---|---|---|
| | None | — | — | — | >−16 | 22 | 300 | 2800 |
| 1 | Attapulgite Clay | 125 | 0.125 | 10 | −15 | 2 | 395 | <3500 |
| 2 | Amberlyst-15 | 70 | 0.05 | 2.8 | −8 | 0.3 | 400 | 6170 |
| 3 | Sodium Amberlyst-15[1] | 70 | 0.05 | 2.8 | −8 | 1.3 | 385 | 5208 |
| 4 | Amberlyst-15 | 125 | 0.125 | 4 | 0 | 0.6 | 330 | 4368 |
| 5 | Alumina-Calcined | 125 | 0.125 | 25 | −4 | 17 | 370 | 4435 |
| 6 | Alumina Sulfated[2] (7% S) | 125 | 0.125 | 19 | >−16 | — | 370 | 6048 |
| 7 | Alumina Sulfated (7% S) | 125 | 0.125 | 35 | >−16 | 6.1 | 370 | 4670 |
| 8 | Alumina + HCl (3 hrs.-HCl+He-950° F) | >0 | 0.10 | 19 | −9 | 3 | 390 | — |
| 9 | Alumina + HCl (3 hrs.-HCl+He-950° F) | >0 | 0.10 | 36 | −16 | 13 | 350 | — |

[1]Amberlyst 15 neutralized with $Na_2CO_3$.
[2]Prepared with $(NH_4)_2SO_4$.

TABLE 2

R.T. *Treatment of Arab Light Stock Over Acidic γ-Alumina

| Sorbent | LHSV | Vol Oil/ Vol Solid | RBOT[(1)] (min) | N ppm |
|---|---|---|---|---|
| γ-$Al_2O_3$ | .05 | 15.7 | 370 | 12 |
| (Calcined 16 hrs- | .05 | 29.6 | 375 | 20 |
| 950° F) | .05 | 41.1 | 335 | — |
| γ-$Al_2O_3$ + HCl | .05 | 6.1 | 410 | 2 |
| (3 hrs - HCl + He- | .05 | 24.2 | 398 | 3 |
| 950° F) | .05 | 35.1 | 360 | 7 |
| γ-$Al_2O_3$ Impregnated With $NH_4)_2SO_4$ (Calcined 2 hrs - He- 950° F) | .05 | 29.2 | 360 | 0.9 |

*Room Temperature.
[(1)]Normal RBOT = 300 minutes.

gamma-alumina. All gave comparable RBOT values while the calcined alumina was inferior to the acidified aliquots with respect to nitrogen removal.

TOST data for sulfated alumina is directly compared with calcined alumina below. Calcined alumina without further acidification yielded, at a 25/1 treat level, an oil with duplicate TOST ca. 4400 hours. One TOST analysis was made on a sulfated alumina containing 7% sulfur showed 6048 hours and ca. 4400 hours at 20/1 and 35/1 treat ratios, respectively.

| Alumina %S | TOST, Hours Volume Oil/Sorbent | | |
|---|---|---|---|
| | 20 | 25 | 35 |
| None | — | 4435 (4418) | — |
| 7.0* | 6048 | — | 4670 (4452) |

*Prepared with $(NH_4)_2SO_4$.

It is well known that clay will improve color and RBOT results and will significantly lower nitrogen content, however, clay percolation has never yielded an oil with a passing TOST. Nevertheless, conditions similar to those used in refinery clay treating were tried (Table 4). Refinery clay percolations are at 0.125 WHSV and generally average about 5/1 volumes of oil to clay. Table 4 is a comparison of clay versus various acidified and unacidified sorbents. Comparing the RBOT results reported in Table 4, sulfated alumina at a 30/1 treat level was superior to the other sorbents tested.

TABLE 4

Comparison of Clay Versus Other Sorbents on Upgrading Arab Light Stock*

| Sorbent | °F | LHSV | RBOT, mins. Vol Oil/Vol Sorbent | | |
|---|---|---|---|---|---|
| | | | 10 | 20 | 30 |
| Attapulgite Clay | 125 | 0.125 | 395 | 375 | — |
| Amberlyst-15 | 125 | 0.125 | 350 | — | — |
| $Al_2O_3$ (calcined) | 125 | 0.125 | 390 | 375 | 360 |
| $Al_2O_3$ Sulfated (6.9% sulfur) | 125 | 0.125 | 425 | 410 | 400 |
| $Al_2O_3$-Chlorided | R.T. | 0.10 | — | 390 | 350 |

*For properties see Table 3.

The sorbents tested in accordance with the data collected in Tables 2 and 4 were unless specified as otherwise prepared in similar manner to the examples specified in Table 1.

It is clear from the foregoing data that the acidified sorbents according to this invention have improved ability to remove polar compounds which are thought to be deleterious to the oxidation characteristics of hydrocarbon oils. The efficient removal of these compounds is manifest by greatly improved oil/sorbent ratio (about 35/1) over conventional clay treatment (about 5/1) or resin treatment (about 3/1). Accordingly, the acidified sorbents disclosed herein provide effective treatment of lubricating oils when compared to conventional clay or resin treatments.

Only preferred embodiments have been exemplified which obviously do not limit the scope of this invention thereto. Departure therefrom and variations thereof within the scope of this invention are within the skill of the art.

We claim:

1. A process for upgrading hydrocarbon lubricating oils, improving the oxidative stability thereof and substantially removing polar compounds normally contained therein, which comprises contacting said lubricating oil with an acidified sorbent selected from the group consisting of alumina, silica-alumina and bauxite said sorbent having been treated to contain at least 3% by weight based on the total weight of said sorbent of an ion selected from the group consisting of sulfate, chloride or bromide, said contacting being carried out at a temperature within the range of ambient to about 250° F and an LHSV within the range of about 0.1 to about 10.

2. The process of claim 1 wherein said acidified sorbent is obtained by contacting said sorbent with an acidifying agent selected from the group consisting of anhydrous hydrogen chloride, aqueous $(NH_4)_2SO_4$, anhydrous HBr, and $H_2SO_4$.

3. The process of claim 2 wherein the sorbent is acidified with $(NH_4)_2SO_4$.

4. The process of claim 2 wherein the sorbent is acidified with anhydrous hydrogen chloride.

5. The process of claim 1 wherein the sorbent is gamma-alumina.

6. The process of claim 1 wherein said contacting of oil with said sorbent is carried out at a ratio of about 15–40 volumes of oil to 1 volume of sorbent.

7. The process of claim 1 wherein an oil of turbine quality is recovered after said process.

8. The process of claim 1 wherein said polar compounds are nitrogenous.

* * * * *